(12) United States Patent
Takegawa (10) Patent No.: US 6,884,015 B1
(45) Date of Patent: Apr. 26, 2005

(54) QUICK RELEASE NUT ASSEMBLY FOR PERCUSSION INSTRUMENT

(75) Inventor: Akito Takegawa, Yachiyo (JP)

(73) Assignee: Pearl Musical Instrument Co., Chiba (JP)

( * ) Notice: Subject to any disclaimer, the term of this patent is extended or adjusted under 35 U.S.C. 154(b) by 0 days.

(21) Appl. No.: 10/704,822

(22) Filed: Nov. 12, 2003

(51) Int. Cl.⁷ .............................................. F16B 37/10
(52) U.S. Cl. ...................... 411/433; 411/437; 411/287
(58) Field of Search ........................ 411/272–273, 433, 411/437, 354, 974, 935–935.1, 170–265; 248/448–449, 59, 131, 405, 408, 423, 230.2

(56) References Cited

U.S. PATENT DOCUMENTS

| | | | | |
|---|---|---|---|---|
| 900,843 | A | * 10/1908 | Folberth ...................... 411/433 |
| 971,375 | A | 9/1910 | Hays |
| 1,074,929 | A | 10/1913 | Cole |
| 1,157,564 | A | * 10/1915 | Mason ....................... 138/89.4 |
| 1,836,524 | A | * 12/1931 | Brittain ....................... 279/120 |
| 2,118,361 | A | 5/1938 | Schaeffer, Jr. |
| 2,218,319 | A | * 10/1940 | Pfauser ........................ 254/98 |
| 2,226,914 | A | * 12/1940 | Sharon ......................... 285/34 |
| 2,304,343 | A | * 12/1942 | Diesbach ...................... 24/270 |
| 2,314,509 | A | * 3/1943 | Olson .......................... 411/280 |
| 2,580,812 | A | * 1/1952 | McEwan ........................ 76/79 |
| 3,084,964 | A | * 4/1963 | Ruth .......................... 403/235 |
| 3,570,836 | A | * 3/1971 | Pettavel ....................... 269/92 |
| 3,599,960 | A | * 8/1971 | Phillips ....................... 269/182 |
| 3,777,516 | A | 12/1973 | Tigges |
| 4,281,857 | A | * 8/1981 | Randall ........................ 285/34 |
| 4,497,092 | A | * 2/1985 | Hoshino ....................... 24/514 |
| 4,787,794 | A | * 11/1988 | Guthrie ....................... 411/433 |
| 5,152,651 | A | 10/1992 | Arteon |
| 5,230,596 | A | 7/1993 | Morad |
| 5,749,691 | A | 5/1998 | Campbell |
| 5,785,480 | A | 7/1998 | Difeo |
| 5,868,538 | A | 2/1999 | Rathbun |
| 5,884,887 | A | * 3/1999 | Garelick et al. ............ 248/423 |
| 5,911,215 | A | * 6/1999 | Fisher, Jr. .................... 124/86 |
| 6,212,917 | B1 | 4/2001 | Rathbun |
| 6,523,799 | B1 | * 2/2003 | Su ............................. 248/404 |
| 6,719,259 | B1 | * 4/2004 | Huang et al. ............. 248/441.1 |

FOREIGN PATENT DOCUMENTS

FR 0563202 * 11/1923 ................. 411/433

* cited by examiner

Primary Examiner—Robert J. Sandy
Assistant Examiner—Jeffrey A. Sharp
(74) Attorney, Agent, or Firm—Liniak, Berenato & White (57) ABSTRACT

An adjustable nut comprises a main body having an axial passageway and a locking insert. First and second wing members are pivotally mounted to the main body, whereby the wing members include respective cam surfaces that deflect the inner surface of the locking insert toward the threaded shaft. The assembly provides three different mounting arrangements. The first and second wing members are adapted to provide (1) a locking position where the main body is immovably locked to the threaded shaft, (2) an adjustment position where the first wing member is in the locking position and the second wing member is in an unlocking position to permit selective adjustment of the main body with respect to the threaded shaft, and (3) a sliding position where the first and second wing members are in an unlocking position to permit the main body to slide axially along the threaded member.

13 Claims, 8 Drawing Sheets

QUICK RELEASE NUT ASSEMBLY FOR PERCUSSION INSTRUMENT

BACKGROUND OF THE INVENTION

1. Field of the Invention

The present invention relates generally to fastening devices, and, more particularly, the invention relates to adjustable nuts for use on threaded shafts such as those found on drum sets having cymbals.

2. Description of Related Art

A drum set is a group of separate percussion instruments which often includes one or more cymbals. The general arrangement for mounting a cymbal onto a drum or other suitable support includes a rod or post which terminates at its upper extremity in a reduced threaded end portion over which the cymbal is fitted and secured in place by a washer and wing nut or other suitable fastening and retaining means.

Figure 16:
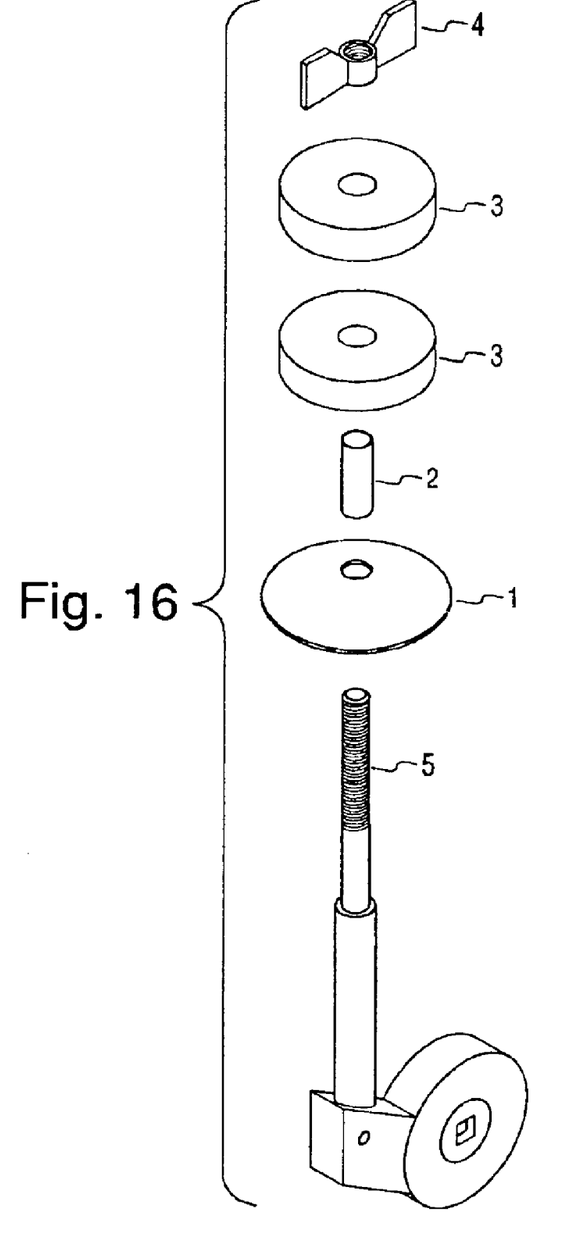
FIG. 16 is a conventional mounting arrangement for a cymbal.

In a typical mounting arrangement, a washer-like rounded metal disc or cup is fitted against a small shoulder on the threaded post. A felt washer or pad rests on the cup. The post is covered by a rubber or plastic sleeve. The central hole of the cymbal is fitted over the post around the sleeve, and the cymbal rests above the felt pad, supported by the metal cup. A felt washer or pad is positioned over the post above the cymbal, and a wing nut is screwed down against the spacing washer. This operation is then repeated for each cymbal. FIG. 16 shows a conventional seat cup arrangement featuring metal seat cup 1, separate sleeve 2, felt members 3 and wingnut 4 which are mounted to a threaded post 5. The cymbal is disposed between the felt members 3.

With particular regard to the cymbal set, the aforementioned wing nut is tightened down over the felt washer to keep the cymbal from flying off the stand when hit. How tightly the wing nut is tightened determines how freely it moves when hit. Some players like cymbals to move, freely therefore they keep the wing nut loose. Others prefer their cymbals to be "firmer" thus they keep the wing nut tighter. Looser cymbals are able to resonate more freely than tighter cymbals therefore another use of the wing nut is to control the amount of resonance of the cymbal.

Another problem encountered in breaking down and reassembling drum sets is an amount of time the setting up and breaking down the drum set consumes. When performing before audiences, there are often two or more consecutive musical bands who perform in sequence. After a first band plays, the drum set must be disassembled and removed from the stage in order that the second band can then set up their drum set and begin playing. This is time consuming and interrupts a rhythm of the concert.

Accordingly, the need exists for an adjustable nut which can be placed on a threaded shaft, and subsequently removed, easily and rapidly.

SUMMARY OF THE INVENTION

The present invention is directed to a quick release nut assembly to overcome the aforementioned drawbacks inherent in the prior art.

The invention provides an adjustable wingnut for use with a threaded shaft, where the adjustable nut comprises a main body having an axial passageway through which the threaded shaft is adapted to pass. A locking insert is fitted to the main body. First and second wing members are pivotally mounted to the main body adjacent the locking insert, whereby the wing members include respective cam surfaces acting on the locking insert toward the axial passageway. The cam surfaces are adapted to deflect an inner surface of the locking insert toward the threaded shaft. The assembly provides three different mounting arrangements. The first and second wing members are adapted to provide (1) a locking position where the main body is immovably locked to the threaded shaft, (2) an adjustment position where the first wing member is in the locking position and the second wing member is in an unlocking position to permit selective adjustment of the main body with respect to the threaded shaft, and (3) a sliding position where the first and second wing members are in an unlocking position to permit the main body to slide axially along the threaded member.

The pivoting wing members lock and unlock the wingnut to a threaded post depending on the orientation of the wings. When the wings are open (unlocking position), the wingnut easily slides past the threads of a threaded post. The wingnut does not have to be spun like conventional wingnuts thus attachment and removal is quick and easy. When the wings are closed (locking position), an engagement means grips the wingnut firmly onto the threads of a threaded post. With one wing open and one wing closed, the wingnut is partially engaged onto the threads of a threaded post and the wingnut can be rotated to adjust the tightness of the wingnut.

These and other new and useful features of the present invention will become apparent with reference to the accompanying drawings.

DETAILED DESCRIPTION OF THE PREFERRED EMBODIMENTS

Figure 1:
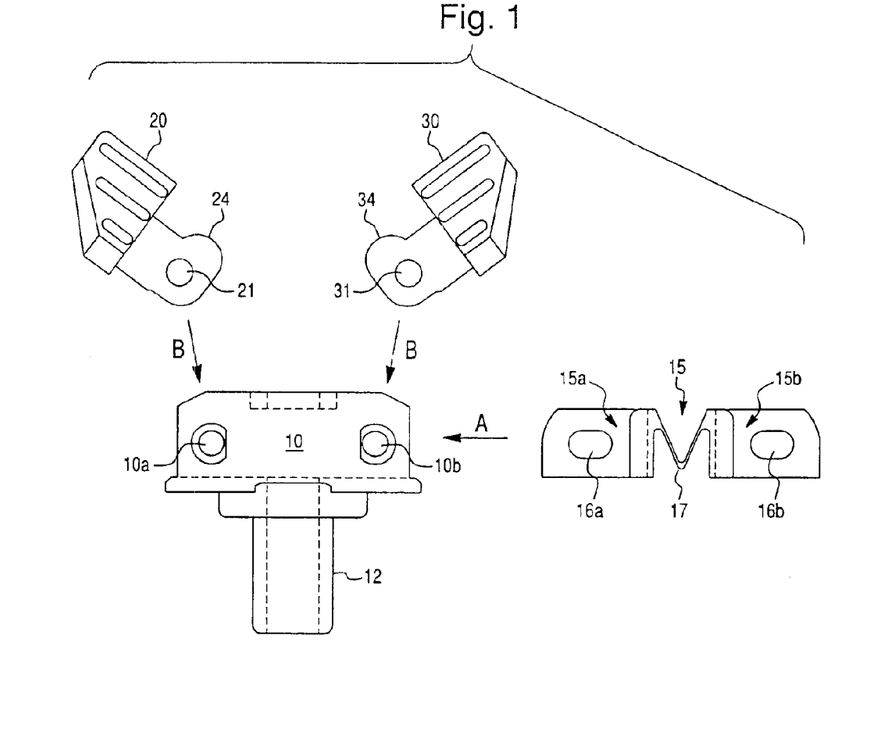
FIG. 1 is an exploded view of the major components of the wingnut assembly.

FIG. 1 is an exploded view of the wingnut assembly according to the present invention showing the main body 10, the locking insert 15, and the first and second wing members 20, 30. As will be described in greater detail below, the locking insert 15 is inserted into a window formed in the main body 10 in the direction of arrow 'A', then the wing members 20, 30 are inserted between the main body 10 and locking insert 15 (see arrow 'B') to thereby straddle the arms 15a, 15b. The apertures 21, 31 of the wing members 20, 30 are aligned with the elongated apertures 16a, 16b of the locking insert 15 and the apertures 10a, 10b of the main body 10.

Figure 2:
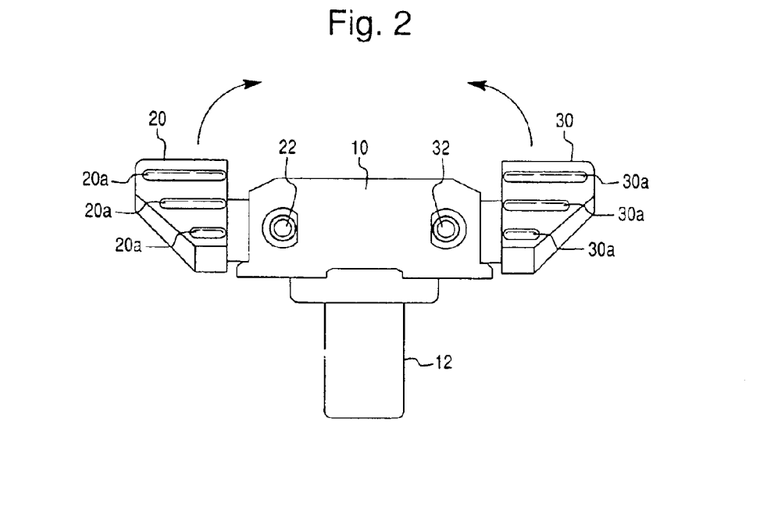
FIG. 2 is a side view of the wingnut assembly according to the present invention in the open position.

FIG. 2 is a side view of the wingnut assembly showing the main body 10 as well as first and second wing members 20, 30. In the embodiment of FIG. 1, the main body 10 includes a sleeve 12 to facilitate stable and effective mounting of a cymbal to a threaded shaft. The sleeve also protects the cymbal hole from damage from the threaded shaft. In the preferred embodiment, the sleeve 12 is integrated or integrally formed with the main body 10; however, the combination main body 10 and sleeve 12 may take different lengths, shapes and forms as understood by those of skill in the art of percussion instruments, namely cymbals and cymbal stands. Alternately, the sleeve 12 may be omitted or formed as a separate member.

Figure 3:
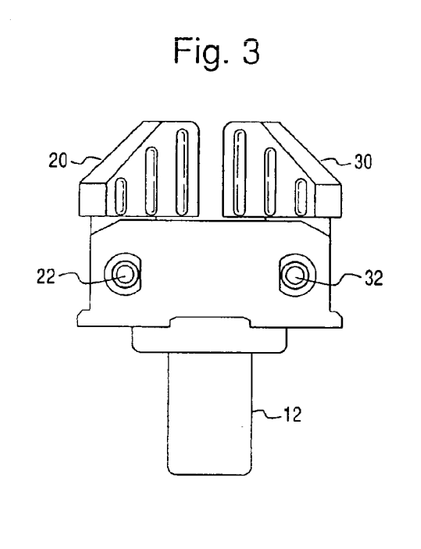
FIG. 3 is a perspective view of the wingnut assembly in the closed position.

The wing members 20, 30 are pivotally mounted to the main body 10 via pivot pins 22, 32; respectively, disposed in the apertures 10a, 10b of the main body 10. Each wing member 20, 30 is preferably provided or formed with gripping members or knurled portions 20a, 30a to facilitate gripping by a user when the user pivots the wing member 20, 30 between an unlocked position (see FIG. 2) and a locked position (see FIG. 3).

Figure 4:
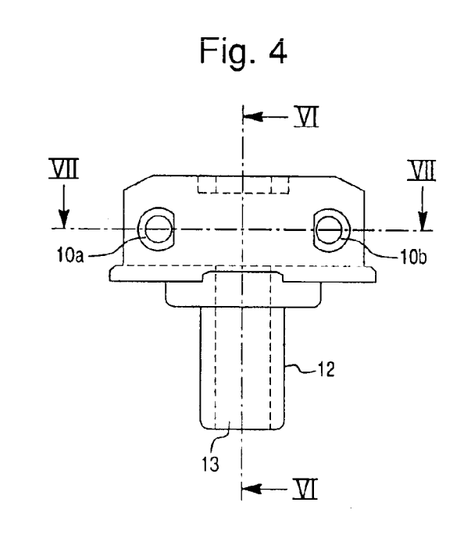
FIG. 4 shows an isolate view of the main body and sleeve.
Figure 5:
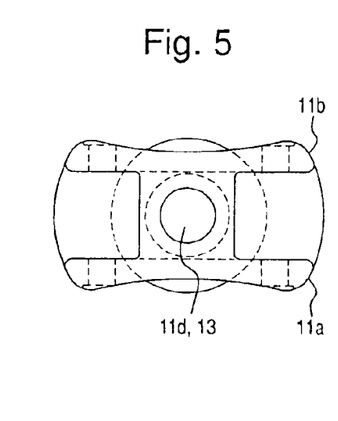
FIG. 5 is a top view of the main body and sleeve.
Figure 6:
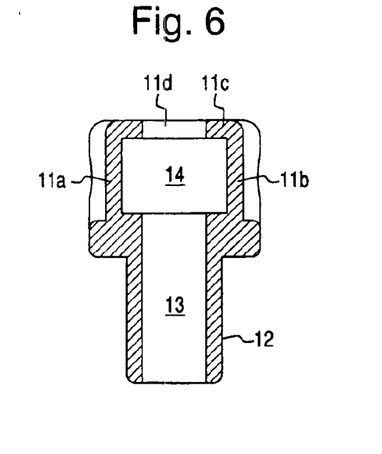
FIG. 6 is a cross sectional view of the main body taken along section line VI—VI of FIG. 4.
Figure 7:
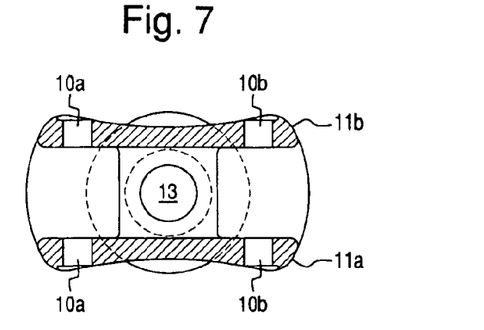
FIG. 7 is a cross sectional view of the main body taken along section line VII—VII of FIG. 4.

FIG. 4 shows an isolate view of the main body 10 and sleeve 12, and FIG. 5 is a top view of the main body 10 and sleeve 12. FIG. 6 is a cross sectional view of the main body 10 taken along section line VI—VI of FIG. 4, and FIG. 7 is a cross sectional view of the main body 10 taken along section line VII—VII of FIG. 4.

The main body 10 comprises sidewalls 11a, 11b with a central top portion 11c having a bore 11d aligned with the axial passageway 13. Mounting apertures 10a, 10b are formed in the sidewalls 11a, 11b. The mounting apertures receive the pivot pins 22, 32 to thereby pivotally mount the wing members 20, 30 to the main body 10 through the locking insert 15 as described below.

With reference to FIG. 6, the locking insert 15 is inserted into the window 14 formed in the main body 10.

Figure 8A:
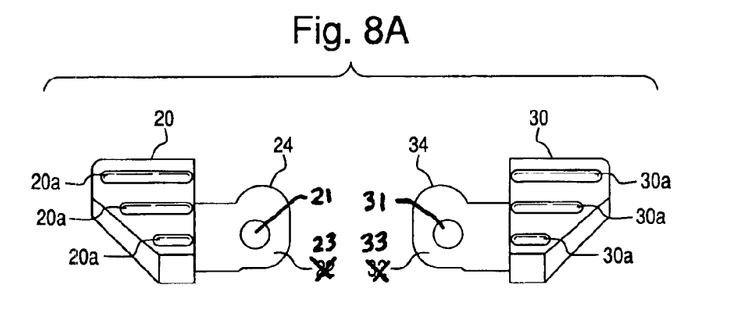
FIGS. 8A and 8B illustrate isolated views of the wing members of the invention.
Figure 8B:
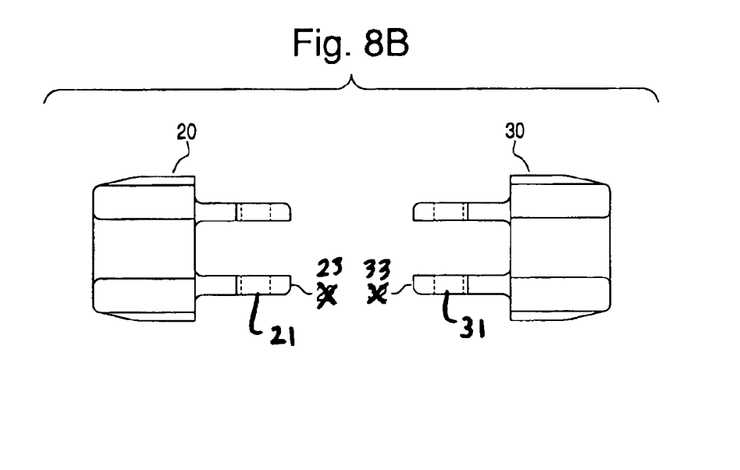

FIGS. 8A and 8B is an isolated side view of the first and second wing members 20, 30. With reference to FIG. 8A, the wing members 20, 30 include a gripping section with knurled portions 20a, 30a, to facilitate gripping by a user when the user pivots the wing member 20, 30 between an unlocked position (see FIG. 2) and a locked position (see FIG. 3). With reference to FIG. 8B, each of the wing members 20, 30 includes a pair of mounting legs 23, 33 with apertures 21, 31 (see FIG. 1) and cam surface 24, 34.

Figure 9:
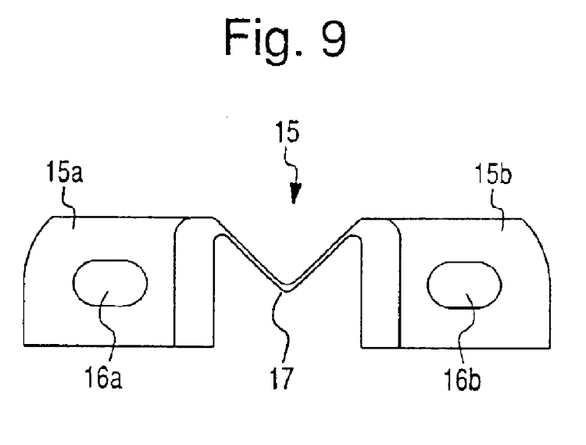
FIG. 9 is a side view of the locking insert.
Figure 10:
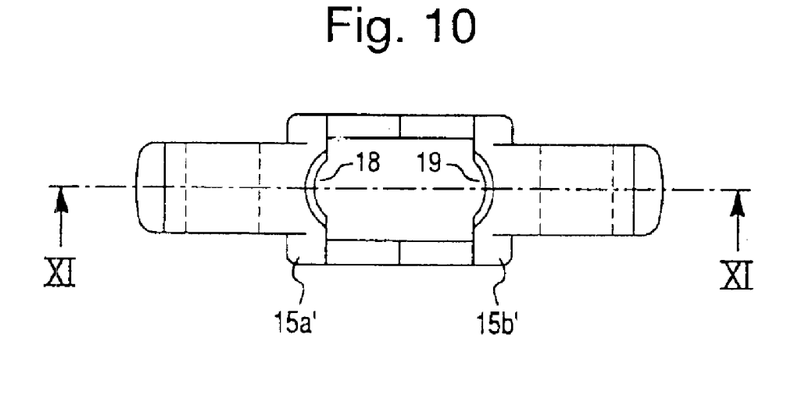
FIG. 10 is a top view of the locking insert
Figure 11:
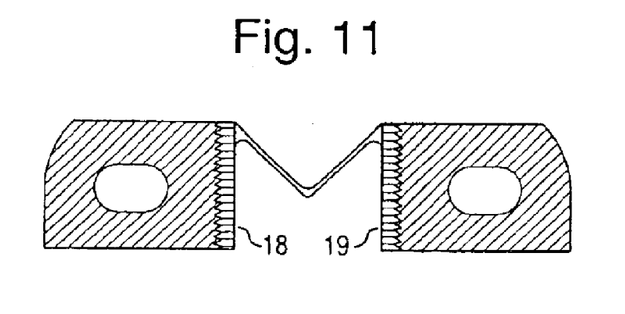
FIG. 11 is a cross sectional view of the locking insert 15 taken along section line XI—XI of FIG. 10.

FIG. 9 is a side view of the locking insert 15 and FIG. 10 is a top view of the locking insert 15. FIG. 11 is a cross sectional view of the locking insert 15 taken along section line XI—XI of FIG. 10.

The locking insert 15 comprises first and second arms 15a, 15b integrally formed and interconnected by a living hinge portion 17 which biases the arms 15a, 15b apart. As shown in FIG. 11, the internal surfaces 18, 19 of the arms 15a, 15b are formed as partially threaded surfaces to match threads of a threaded post in the manner described below. When the wing members 20, 30 straddle the locking insert 15, the cam surfaces 24, 34 are positioned to engage the lateral projections 15a', 15b' of the arms 15a, 15b. The elongated apertures 16a, 16b allow the arms 15a, 15b (and internal surfaces 18, 19) to move relative to the main body 10.

Figure 12:
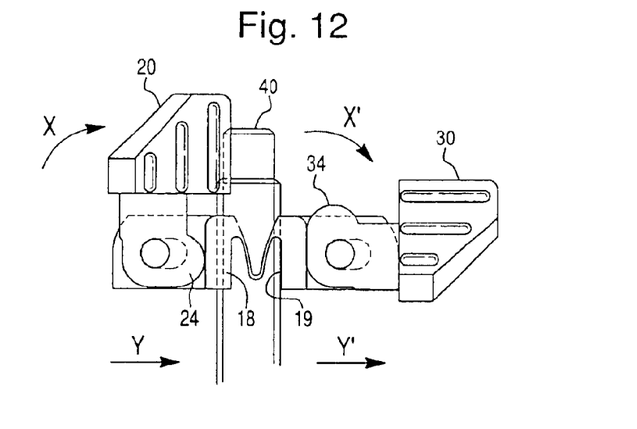
FIG. 12 is a view of the locking insert and wing members shown mounted to a cymbal post with the main body omitted for clarity.

Operation of the present invention will be described with reference to FIG. 12, which is a view of the locking insert 15 and wing members 20, 30 shown mounted to a cymbal post 40 with the main body 10 omitted for clarity. The wing members 20, 30 may be pivoted in the direction of arrows X and X'. As the wing member 20 is pivoted to the upright position in the direction of X shown in FIG. 12, the internal surface 18 is deflected in the direction of arrow Y against the cymbal post 40 whereby the threaded portion of the internal surface 18 mates with threads provided on the cymbal post 40. Likewise, when the wing member 30 is pivoted to the down position in the direction of X' shown in FIG. 12, the internal surface 19 is biased in the direction of arrow Y' by the living hinge 17 away from the cymbal post 40 whereby the threaded portion of the internal surface 19 moves away and disengages from the threads provided on the cymbal post 40.

Figure 13:
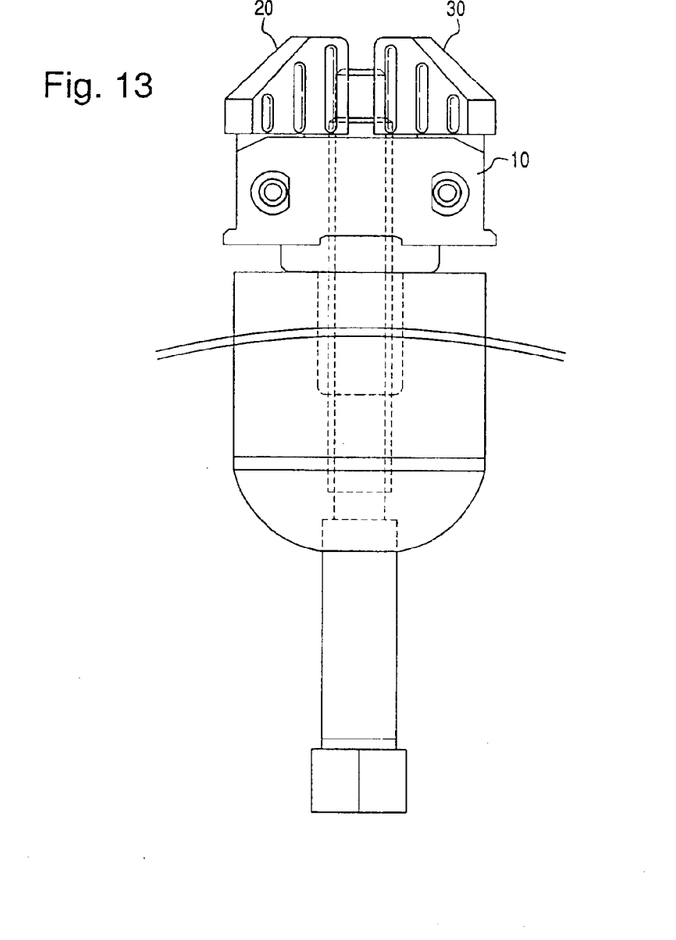
FIG. 13 is a view of the wingnut assembly shown mounted to a cymbal post in the locking position.
Figure 14:
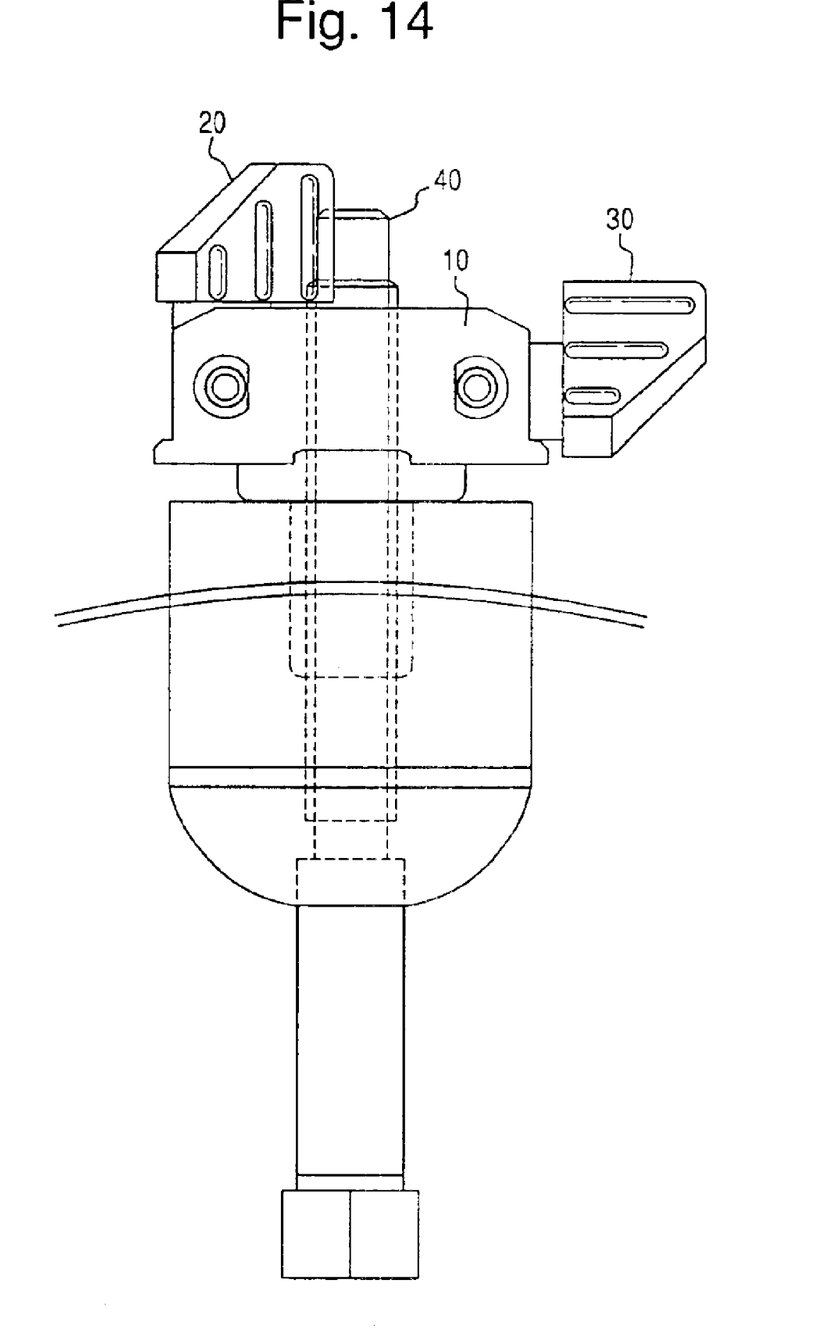
FIG. 14 is a view of the wingnut assembly shown mounted to a cymbal post in the adjustment position.
Figure 15:
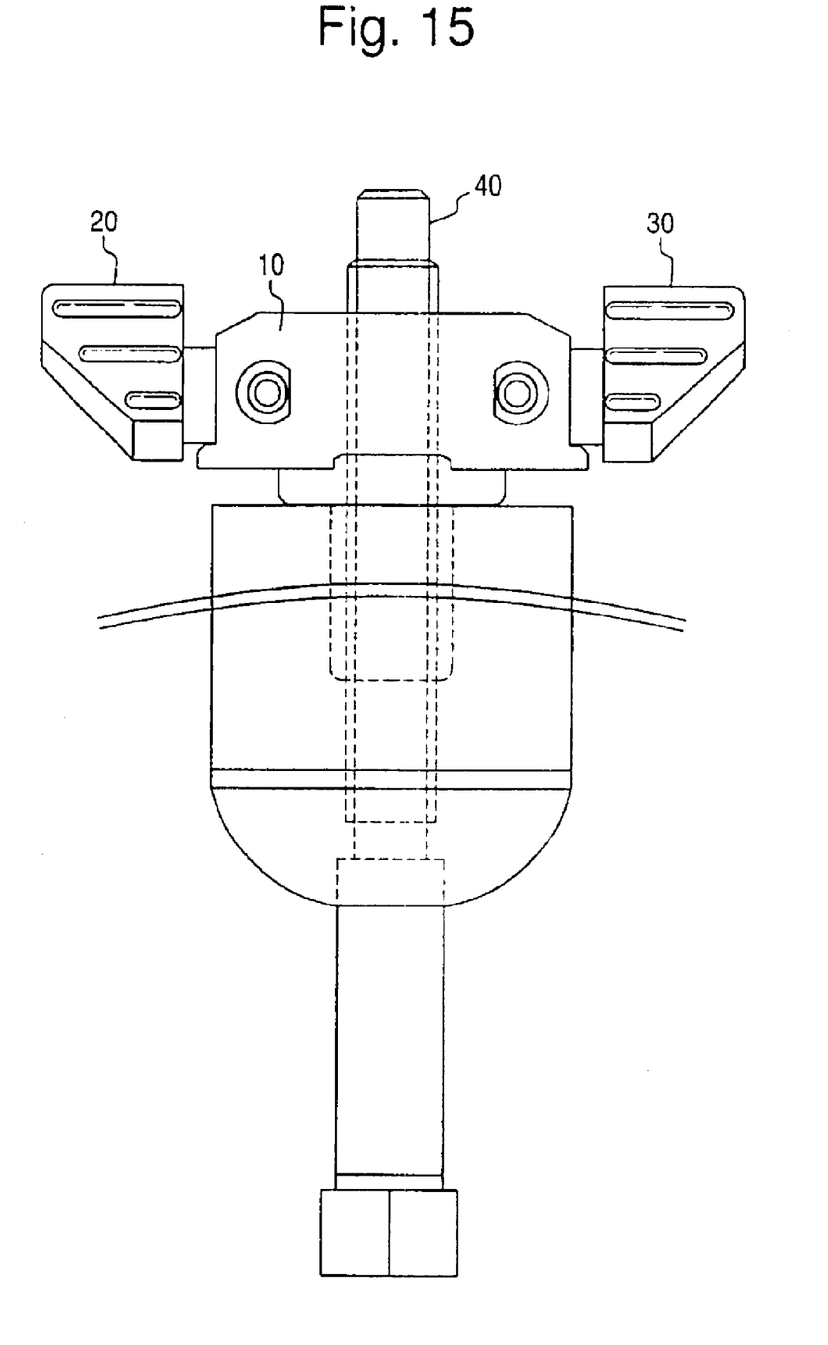
FIG. 15 is a view of the wingnut assembly shown mounted to a cymbal post in the sliding position.

The assembly of the present invention provides three different mounting arrangements. The first and second wing members 20, 30 are adapted to provide: (a) a locking position where the main body 10 is immovably locked to the threaded shaft 40 when both wing member 20, 30 are in the upright (engaged) position (see FIG. 13); (b) an adjustment position where one of the wing members 20, 30 is in the locking position and the other wing member 20, 30 is in an unlocking position to permit selective adjustment of the main body 10 with respect to the threaded shaft 40 (see FIG. 14), and (c) a sliding position where both wing members 20, 30 are in an unlocking position to permit the main body 10 to slide axially along the threaded member 40 (see FIG. 15).

While the foregoing invention has been shown and described with reference to a preferred embodiment, it will be understood by those of skill in the art that various changes in form and detail may be made therein without departing from the spirit and scope of the present invention.

What is claimed is:

1. An adjustable nut for use with a bolt having a threaded shaft, said adjustable nut comprising:

a main body having an axial passageway through which said threaded shaft is adapted to pass;

a locking insert mounted within said main body, said locking insert having a movable internal surface facing said threaded shaft;

at least one wing member pivotally mounted to said main body, said wing member including a cam surface adjacent said locking insert, said cam surface adapted to deflect said internal surface toward said threaded shaft, wherein said locking insert and said main body include apertures which are aligned with an aperture provided in said first and second wing members.

2. An adjustable nut for use with a bolt having a threaded shaft, said adjustable nut comprising:

a main body having an axial passageway through which said threaded shaft is adapted to pass, said main body carrying a movable internal surface of said axial passageway facing said threaded shaft;

first and second wing members pivotally mounted to said main body, said wing members including a respective cam surface adjacent said axial passageway, said cam surface adapted to deflect said movable internal surface toward said threaded shaft;

wherein said first and second wing members are adapted to provide a locking position where said main body is immovably locked to said threaded shaft, an adjustment position where said first wing member is in said locking position and said second wing member is in an unlock position to permit selective adjustment of said main body with respect to said threaded shaft, and a sliding position where said first and second wing members are in an unlocking position to permit said main body to slide axially along said threaded shaft, wherein said locking insert and said main body include apertures which are aligned with an aperture provided in said first and second wing members.

3. An adjustable nut for use with a bolt having a threaded shaft, said adjustable nut comprising:

a main body having an axial passageway through which said threaded shaft is adapted to pass;

a locking insert mounted within said main body, said locking insert having a movable internal surface facing said threaded shaft, said internal surface defining a portion of said axial passageway, wherein said internal surface is integrally formed with and connected to said locking insert by a substantially v-shaped, living hinge adapted to bias said internal surface away from said axial passageway and said threaded shaft, said substantially v-shaved living hinge providing an accordion effect so as to permit the upper and lower ends of the internal surface to move uniformly in a direction transverse to said axial passageway and provide an engagement with said threaded shaft;

at least one wing member pivotally mounted to said main body, said wing member including a cam surface adjacent said locking insert, said cam surface adapted to deflect said internal surface toward said threaded shaft.

4. The adjustable nut according to claim 3, wherein said at least one wing member comprises first and second wing members adapted to provide a locking position where said main body is immovably locked to said threaded shaft, an adjustment position where said first wing member is in said locking position and said second wing member is in an unlock position to permit selective adjustment of said main body with respect to said threaded shaft, and a sliding position where said first and second wing members are in an unlocking position to permit said main body to slide axially along said threaded member.

5. The adjustable nut according to claim 3, wherein said internal surface is defined by a pair of internal surfaces formed on said locking insert, said pair of internal surfaces facing one another.

6. The adjustable nut according to claim 3, wherein said main body is integrally formed with a cylindrical sleeve adapted to pass through an aperture of a cymbal.

7. The adjustable nut according to claim 3, wherein said at least one wing member include a knurled portion to facilitate gripping by an operator.

8. The adjustable nut according to claim 3, wherein said at least one wing member straddles said locking insert.

9. An adjustable nut for use with a bolt having a threaded shaft, said adjustable nut comprising:

a main body having an axial passageway through which said threaded shaft is adapted to pass;

a locking insert mounted within said main body, said locking insert comprising a pair of movable internal surfaces that face said threaded shaft, said internal surfaces extending between an upper end and a lower end defining a portion of said axial passageway, wherein said internal surfaces are integrally formed with and connected by a substantially v-shaped, living hinge adapted to bias said internal surfaces away from said axial passageway and said threaded shaft, said substantially v-shaped living hinge providing an accordion effect so as to permit the upper and lower ends of the internal surfaces to move uniformly in a direction transverse to said axial passageway and provide an engagement with said threaded shaft;

first and second wing members pivotally mounted to said main body, said wing members including a respective cam surface adjacent said axial passageway, said cam surface adapted to deflect said movable internal surface toward said threaded shaft;

wherein said first and second wing members are adapted to provide a locking position where said main body is immovably locked to said threaded shaft, an adjustment position where said first wing member is in said locking position and said second wing member is in an unlock position to permit selective adjustment of said main body with respect to said threaded shaft, and a sliding position where said first and second wing members are in an unlocking position to permit said main body to slide axially along said threaded shaft.

10. The adjustable nut according to claim 9, wherein said main body is integrally formed with a cylindrical sleeve adapted to pass through an aperture of a cymbal.

11. The adjustable nut according to claim 9, wherein said wing members include a knurled portion to facilitate gripping by an operator.

12. The adjustable nut according to claim 9, wherein said locking insert comprises a central aperture aligned with said axial passageway.

13. The adjustable nut according to claim 9, wherein wing members straddle said locking insert.

* * * * *